April 9, 1963

C. E. STANSELL 3,084,840

DISPENSING DEVICES

Filed May 25, 1959

INVENTOR
Charles E. Stansell

BY *Bostwick Ashley*

ATTORNEY

April 9, 1963  C. E. STANSELL  3,084,840
DISPENSING DEVICES

Filed May 25, 1959  6 Sheets-Sheet 2

INVENTOR
Charles E. Stansell

BY
ATTORNEY

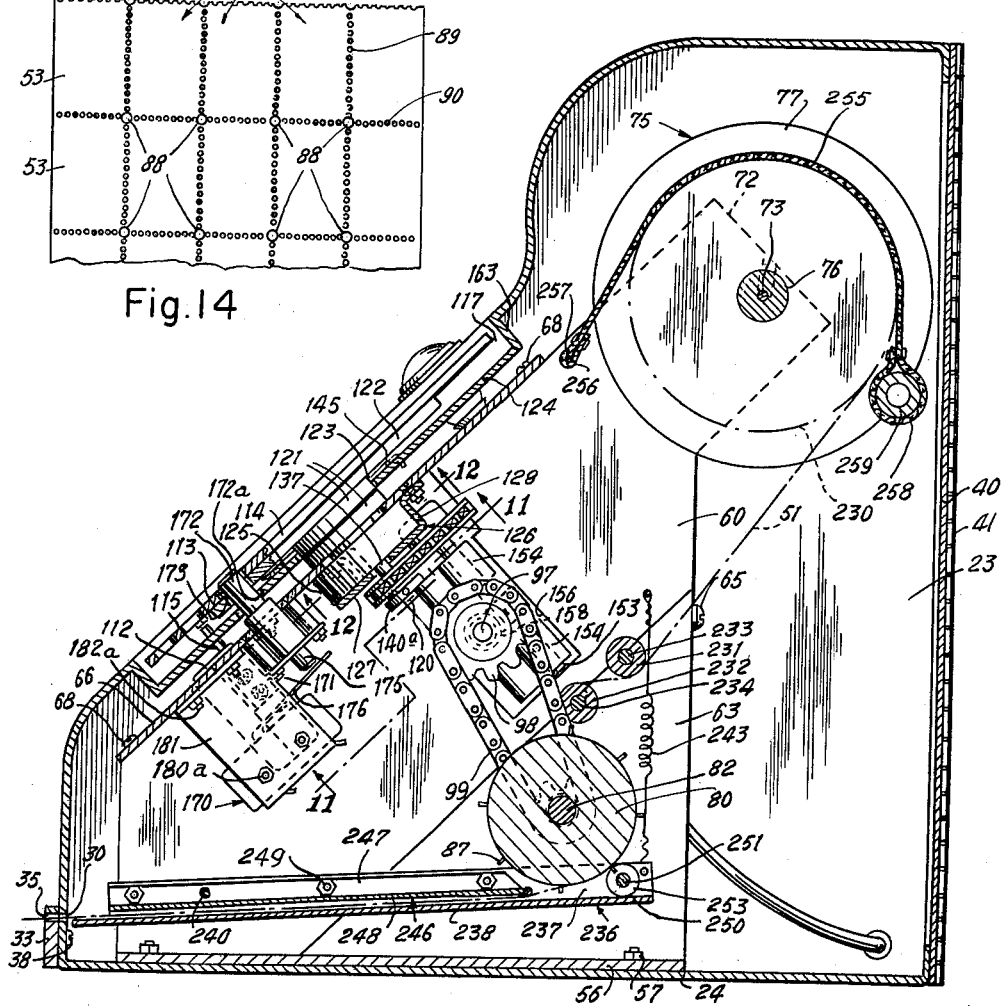

INVENTOR
Charles E. Stansell
BY
ATTORNEY

April 9, 1963 C. E. STANSELL 3,084,840
DISPENSING DEVICES

Filed May 25, 1959 6 Sheets-Sheet 5

INVENTOR
Charles E. Stansell

BY *Hastings Ashley*

ATTORNEY

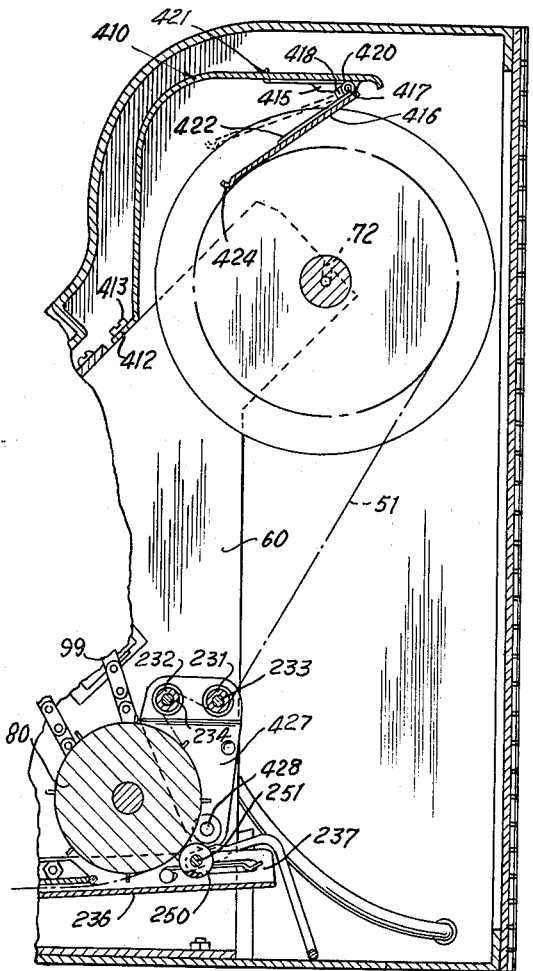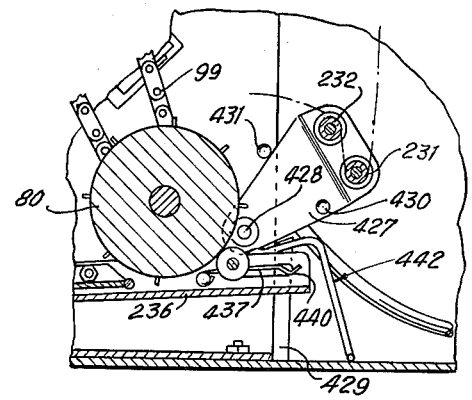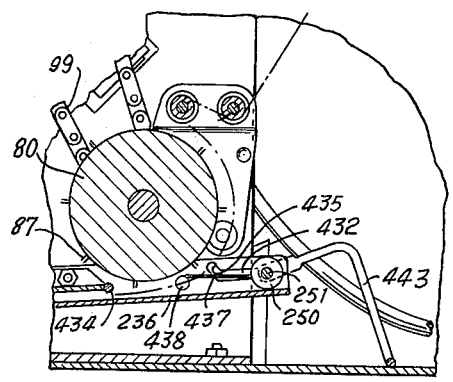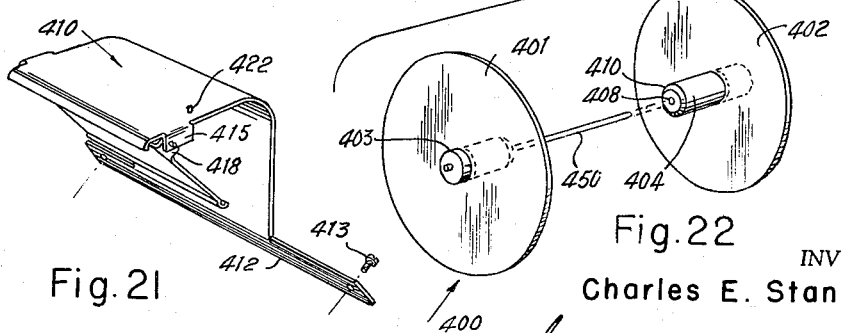

United States Patent Office 3,084,840
Patented Apr. 9, 1963

3,084,840
DISPENSING DEVICES
Charles E. Stansell, 3810 Inwood Road, Dallas, Tex.
Filed May 25, 1959, Ser. No. 815,631
5 Claims. (Cl. 226—82)

This invention relates to dispensing devices and more particularly to a device for dispensing perforated tapes or strips such as tapes or strips of trading stamps, coupons and the like.

An object of this invention is to provide a new and improved device for dispensing preselected lengths of perforated tape or strip, such as strips of trading stamps, coupons or the like.

Another object is to provide a new and improved stamp dispensing device which automatically dispenses a preselected length of a strip of stamps having a preselected number of stamps.

Still another object is to provide a stamp dispensing device for dispensing preselected numbers of stamps from a rolled strip of stamps having an electric power means for dispensing stamps from the strip and a control means for the power means for energizing the power means for a predetermined cycle of operation to cause the power means to dispense a predetermined number of stamps from the roll.

A further object is to provide a stamp dispensing device having a drive roller which is rotated by an electric motor and which is provided with a positive stop means for preventing rotation of the drive roller in either direction when a predetermined number of stamps has been dispensed to prevent a greater or lesser number than the desired number of stamps from being dispensed.

A still further object is to provide a stamp dispensing device having a drive roller for dispensing stamps from a strip of stamps wound into a roll which is driven by an electric motor and has a control means which permits preselection of the number of stamps to be dispensed and controls the operation of the drive roller to cause exactly the preselected number of stamps to be dispensed.

Another object is to provide a stamp dispensing device having a drive roller for dispensing a preselected number of stamps from a strip of stamps which is driven by an electric motor having a control means which permits preselection of a desired number of stamps to be dispensed and controls the operation of the drive roller to permit only the preselected number of stamps to be dispensed thereby wherein the control means includes a rotatable dial which is rotated through a predetermined angle which varies with the preselected number of stamps to set the control means to permit only the predetermined number of stamps to be dispensed by the drive roller.

Still another object of the invention is to provide a stamp dispensing device having a stamp engaging drive roller for feeding or dispensing a strip of stamps from the dispensing device driven by an electric motor whose actuation is controlled by a control means having a dial which is operatively connected to the drive roller and to the electric motor to control the number of revolutions of the drive shaft of the motor in accordance with the distance through which the dial is rotated to preselect the number of stamps.

A further object is to provide an electrical control circuit for the electric motor of a stamp dispensing device having a plunger for preventing rotation of the drive roller which dispenses or feeds a strip of stamps from the dispensing machine whose actuation is controlled by a switch which closes when the control dial of the stamp dispensing device is rotated to preselect a number of stamps to be rotated whereby the actuation of the control dial causes the plunger to free the drive roller for rotation.

A still further object is to provide a control circuit for the electric motor of a stamp dispensing device having a solenoid plunger for preventing rotation of the drive roller which dispenses a strip of stamps from the dispensing machine whose actuation is controlled by a switch which closes when the control dial of the stamp dispensing device is rotated to preselect the number of stamps to be dispensed whereby actuation of the control dial causes the plunger to free the drive roller for rotation, and having another switch which is closed to cause the drive motor to be energized when the control dial has been rotated through the preselected distance which corresponds to the number of stamps to be dispensed, the first control switch being again opened when the control dial has rotated back to its initial position to deenergize the solenoid and cause the plunger to abruptly stop rotation of the stamp drive roller.

A still further object is to provide a control circuit for the electric motor of a stamp dispensing device having a solenoid plunger for preventing rotation of the drive roller which dispenses a strip of stamps from the dispensing machine whose actuation is controlled by a switch which closes when the control dial of the stamp dispensing device is rotated to preselect the number of stamps to be dispensed whereby actuation of the control dial causes the plunger to free the drive roller for rotation, and having another switch which is closed to cause the drive motor to be energized when the control dial has been rotated through the preselected distance which corresponds to the number of stamps to be dispensed, the first control switch being again opened when the control dial has rotated back to its initial position to deenergize the solenoid and cause the plunger to abruptly stop rotation of the stamp drive roller, the plunger having a free end portion provided with convergent sides which is receivable in correspondingly shaped peripheral slots of a stop disk rigid with the drive roller whereby the drive roller is cammed at the end of each cycle of operation of the device to a position wherein the strip is so located at a dispensing or delivery slot that a row of transverse perforations of the strip is properly positioned to permit severance of the dispensed stamps along the row without tearing any of the stamps.

Another object of the invention is to provide a stamp dispensing device having a pair of stamp dispensing units, one unit is for dispensing a strip of stamps comprised of a plurality of transversely aligned longitudinal rows of stamps and the other unit dispensing stamps from a single row of longitudinally aligned stamps whereby any number of stamps, either odd or even, may be dispensed by the stamp dispensing device.

Still another object is to provide a stamp dispensing device for dispensing a strip of longitudinally aligned stamps which has a positive locking means for stopping actuation of a stamp driving means when a preselected number of stamps has been dispensed thereby and to position the last dispensed stamp of the strip of stamps in such position relative to a tearing edge that it is severed at its line of connection to the next adjacent undispensed stamp whereby tearing of the stamps is precluded.

Still another object is to provide a stamp dispensing device for dispensing preselected number of stamps from a strip of stamps wound into a roll by means of a drive roller wherein the roll of stamps is easily and quickly loaded into the stamp dispensing device and into engagement with guide roller and stamp drive roller, the guide rollers about which the strip extends being mounted for movement away from the drive roller to facilitate threading of the strip thereabout and about the drive roller.

A further object is to provide a stamp dispensing device having a drive roller for moving a strip of stamps and a pressure roller adjacent the drive roller for yieldably holding the strip of stamps in engagement with the drive roller, the pressure roller being mounted for movement away from the drive roller to facilitate threading of the strip between the guide roller and the drive roller.

A still further object is to provide a stamp dispensing device having a drive roller for moving a strip of stamps through a dispensing or delivery slot and a counter operatively connected to the drive roller for indicating the number of stamps dispensed by the device.

Another object is to provide a drum on which the roll of stamps may be easily mounted, the drum assembly having a pair of side disks whose central core sections extend toward each other, one of the core sections having a shaft extendable releasably through a central bore of the other core section whereby a roll of stamps without a central core may be easily mounted on the drum.

Additional objects and advantages of the invention will be readily apparent from the reading of the following description of a device constructed in accordance with the invention, and reference to the accompanying drawings thereof, wherein:

FIGURE 5 is a vertical sectional view taken on line 5—5 of FIGURE 4;

FIGURE 11 is a sectional view taken on line 11—11 of FIGURE 5;

FIGURE 13 is a top plan view of a portion of the strip of stamps formed of a single row of longitudinally aligned stamps;

FIGURE 14 is a top plan view of a strip of stamps formed of a plurality of transversely aligned rows of longitudinally aligned stamps;

FIGURE 18 is a fragmentary vertical sectional view of a modified form of the stamp dispensing device;

FIGURE 19 is a fragmentary vertical sectional view showing a pair of guide rollers of the device of FIGURE 18 in a loading or strip threading position;

FIGURE 20 is a fragmentary vertical sectional view showing pressure roller of the device of FIGURE 18 in loading or strip threading position;

FIGURE 21 is a perspective view of the stamp roll brake of the device illustrated in FIGURE 18; and, FIGURE 22 is a perspective exploded view of the drum assembly of the device illustrated in FIGURE 18.

Figure 1:
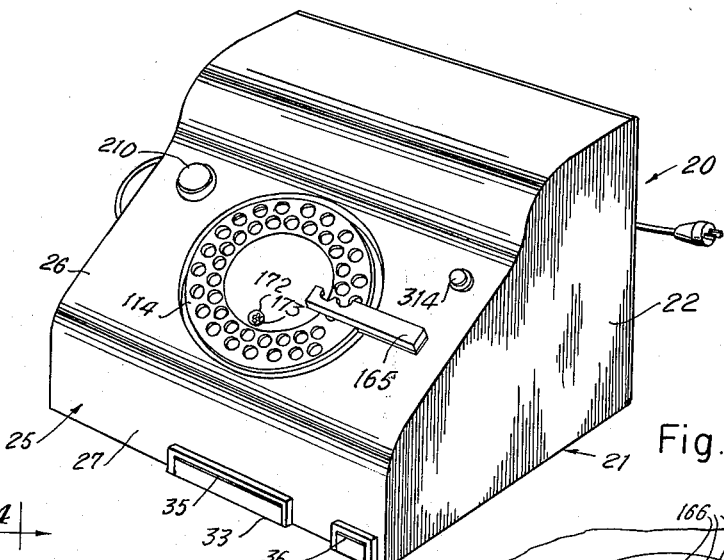
FIGURE 1 is a perspective view of a stamp dispensing device embodying the invention.
Figure 2:
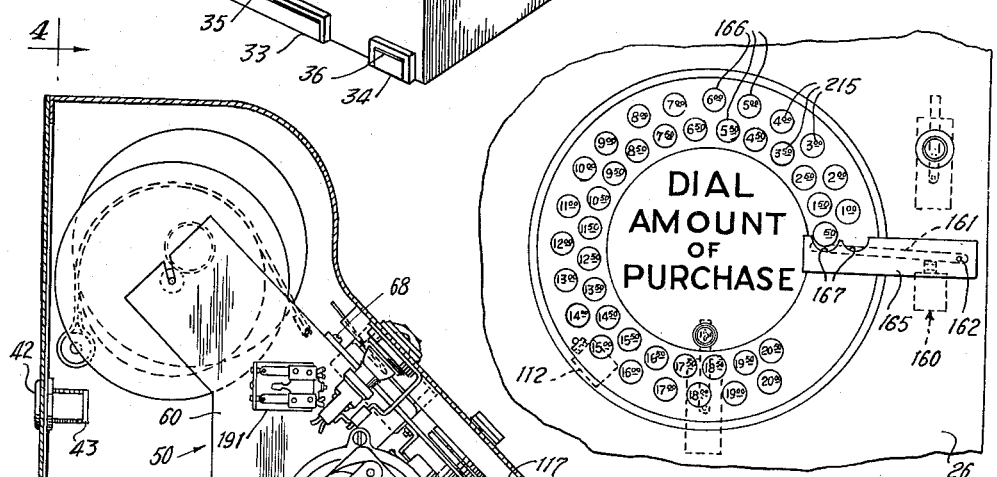
FIGURE 2 is a fragmentary top plan view of the control dial and associated control elements of the stamp dispensing device illustrated in FIGURE 1.
Figure 3:
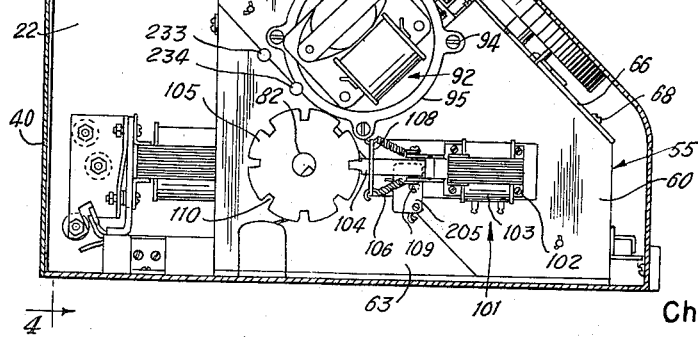
FIGURE 3 is a vertical sectional view of the stamp dispensing device taken on line 3—3 of FIGURE 4.
Figure 4:
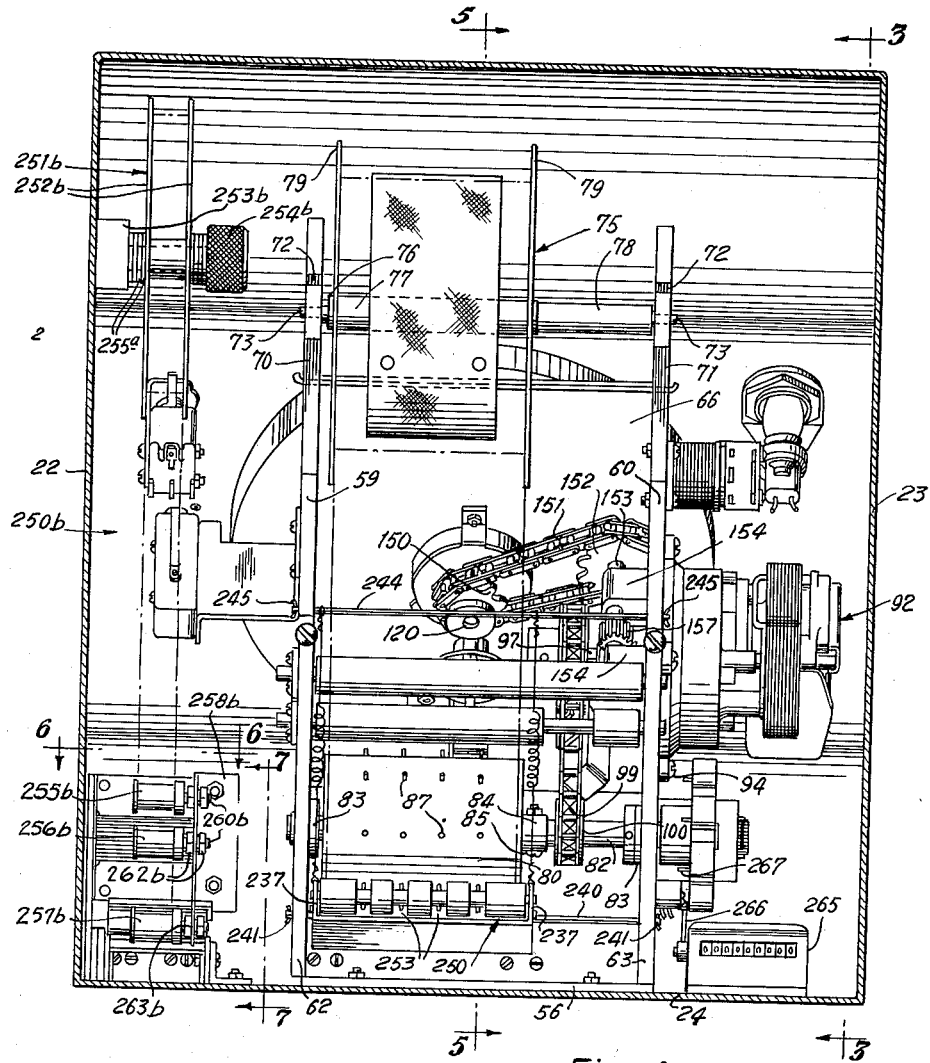
FIGURE 4 is a vertical sectional view taken on line 4—4 of FIGURE 3.

Referring now particularly to FIGURES 1 through 12 of the drawings, the stamp dispensing device 20 includes a housing 21 having side walls 22 and 23 extending outwardly from a bottom wall 24 and connected by a front wall 25 which has an intermediate angularly extending portion 26 on which the controls of the dispensing device are mounted. The lower substantially vertical portion 27 of the front wall 25 is provided with a pair of transverse slots 30 and 31 through which the strips of stamps may be dispensed from within the housing. Reinforcing blocks 33 and 34, whose transverse slots 35 and 36 are aligned with the housing transverse slots 30 and 31, respectively, are secured to the front wall by any suitable means, as by screws 38.

The open rear side of the housing is closed by a back cover 40 hingedly connected to the side wall 23 by a piano hinge 41. The rear cover is provided with a suitable lock 42 which engages with an internal catch 43 on the side wall 22 to hold the rear cover locked against unauthorized opening. A key held by the operator being needed to actuate the lock 42.

A stamp dispensing unit 50 for dispensing a strip 51 formed of a plurality of transversely aligned longitudinal rows 52 of longitudinally aligned stamps 53 is mounted in the housing to dispense stamps through the wide longitudinal slots 30 and 35 of the front wall and of the reinforcing block 33, respectively.

The stamp dispensing unit 50 for dispensing the wide strip 55 includes a support frame 55 having a bottom plate 56 rigidly connected to the bottom wall 24 by means of bolts 57, and upwardly and rearwardly extending side plates 59 and 60 integral at their bottom edges with the bottom plate 56. A pair of triangularly shaped lower side sections 62 and 63 are disposed below the lower rear edges of the side plates 59 and 60, respectively, and have lower edges resting on the bottom plate 56. The lower side sections are rigidly secured to the side plates 59 and 60 by means of screws 65. The supporting frame 55 also includes a forward supporting plate 66 whose extreme lateral rear portions abut the upwardly and rearwardly inclined forward edges of the side plate and are secured thereto in any suitable manner, as by screws 68.

The side plates are provided at their upper ends with rearward and upward extensions 70 and 71 having upwardly and rearwardly extending slots 72 for receiving the outer end portions of a shaft 73 on which is rotatably mounted a stamp reel or drum 75. The stamp drum includes spacer sleeves 76, 77 and 78 and disks 79 positioned at opposite ends of the sleeve 77, all rotatably mounted on the drum shaft 73.

A stamp drive roller 80 is mounted on a shaft 82 which in turn is rotatably mounted on the side plates of the support frame below and forwardly of the drum shaft by means of bearings 83. The drive roller 80 is provided with a hub 84 which is rigidly connected to the shaft 82 by a bolt 85 which extends through aligned apertures in the shaft and in the hub. The drive roller is provided with longitudinally and circumferentially spaced drive lugs 87 adapted to be received in the drive apertures 88 provided in the strip 51, the drive apertures being provided at the intersections of the longitudinal and transverse rows 89 and 90, respectively, of tear perforations which are located at adjacent edges of adjacent stamps of the strip.

An electric motor 92 disposed between the side wall 23 of the housing and the side plate 63 of the support frame is secured to the support frame by suitable screws 94 which extend through apertures in the base 95 of the motor into suitable threaded bores in the side plate. The drive shaft 97 of the electric motor 92 extends through a suitable aperture in the side plate 63 of the support frame and has a sprocket 98 rigidly secured to its inner end. A drive chain 99 extends about the sprocket of the drive shaft and about a sprocket 100 rigidly secured to the shaft 82 whereby the motor when energized causes the drive roller to rotate.

A solenoid assembly 101, rigidly secured to the side plate 60 in any suitable manner as by screws 102 which extend into suitable threaded bores in the side plate 60, includes the usual coil 103 and plunger 104 which is drawn into the coil when the coil is energized. The plunger is biased outwardly of the coil and toward a stop disk 105 of the drive roller shaft 82 by a pair of tension springs 106 whose rear ends are secured to a laterally extending bracket 108 of the solenoid assembly and whose forward ends are secured to a bolt 109 secured to the plunger 104. It will be apparent that when the solenoid coil 103 is energized, the plunger 106 is moved into the coil against the resistance of the springs 106 and that when the solenoid coil 103 is de-energized the springs 106 move the plunger outwardly and into one of the peripheral recesses 110 of the stop disk. The stop recesses or notches 110 of the stop disks are spaced in accordance with the lengths of the individual stamps 53 and are so aligned with respect to the drive lugs 87 of the drive roller that whenever the motor is de-energized, the plunger prevents further rotation of the stop disk, and therefore of the stamp drive roller, and causes the strip of stamps which has been dispensed through the aperture slot dispensing slot 35 of the reinforcing block 33 to be so positioned that the transverse row of perforations 90 between the last transverse row of stamps dispensed and the remainder of the strip is aligned with the outer surfaces of the reinforcing block whereby the stamps may be easily separated from the strip by pulling upwardly or downwardly thereon to cause the last dispensed transverse row of stamps to be easily severed from the strip along the line of perforations.

The free end portion of the plunger which is movable into the stop slots has outwardly convergent side edges which conform to the shape of the slots so that the camming action between the side edges of the plunger and the surfaces of the stop disk defining each slot causes the drive roller shaft always to be moved to predetermined positions which cause the selected transverse row 90 of perforations of the strip 51 to be properly positioned at the outer edge of the delivery slot 35 to facilitate the severance of the dispensed stamps and prevent tearing thereof. This camming action moves the strip forward if for some reason the motor stops rotating somewhat prematurely or rearward if the motor overruns somewhat.

The energization of the solenoid coil 103 is controlled by a switch 112 normally held open by the engagement of a pin 113 of the control dial 114 with the movable contact 115 of the switch.

The dial 114 is disposed in a well or recess 117 formed in the rearwardly and upwardly inclined intermediate section 26 of the front wall of the housing and is rigidly mounted on a shaft 120 which extends through suitable spacer rings 121 disposed between the backing plate 122 of the dial and the upper plate 66 of the supporting frame 55, the spacer rings and the shaft extending into the interior of the housing through a suitable aperture 123 in the inwardly depressed portion 124 of the front wall defining the bottom of the well 117.

Figure 12:
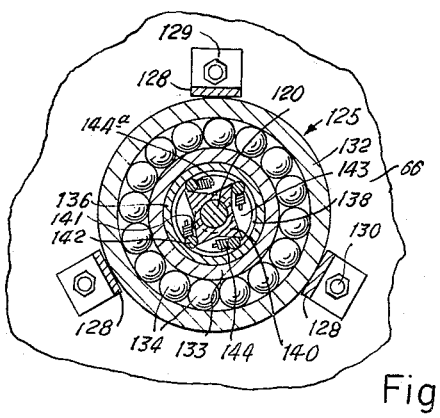
FIGURE 12 is a sectional view taken on line 12—12 of FIGURE 5.

The shaft of the dial extends through a clutch assembly 125 secured to the underside of the front plate 66 of the supporting frame by a support bracket 126. The support bracket includes a circular disc 127 provided with three legs 128 having angularly outwardly turned flanges 129 which abut the underside of the support plate 66 and are secured thereto by bolts 130. The clutch assembly 125 includes an outer bearing 132, engaged by the clamp bracket 126, and an inner race 133. Ball bearings 134 are disposed between the outer bearing and the inner race. A clutch housing or cup 138 is press fitted into the inner race 133 to cause it to rotate therewith and has a hollow shaft 137 extending downwardly and rearwardly from the bottom wall of the clutch cup. The dial shaft 120 extends through the cup and through the hollow shaft and is secured against upward displacement therefrom by a retainer ring 140a disposed downwardly of the hollow shaft 137 and rigidly secured to the lowermost end of the dial shaft by any suitable means, such as a set screw. The inner clutch member 140 is rigidly secured to the dial shaft and is disposed within the clutch housing or cup 138. The inner clutch member has wedging surfaces 141 which are adapted to engage the rollers movably mounted on a pair of support plates 143, one of which is seen in FIGURE 12, rigidly mounted in longitudinally spaced relation on the dial shaft 120. The rollers are biased into contact with the wedge surfaces 141 and the internal wall of the clutch cup or housing by springs 144 which bear against the rollers and the upstanding lugs 144a of the support plate.

The control dial 114 is biased in a counterclockwise direction, as seen in FIGURE 1, by a helical spring 145 one of whose ends is secured to the backing plate 122 of the dial and the other of whose ends is secured to the depressed section 124 of the front wall.

It will be apparent that the dial may be rotated in a clockwise manner against the yielding resistance of the helical spring 145. The wedge surfaces 141, during such movement of the dial, tend to move away from the rollers 142 whereby rotation of the dial shaft 120 and the dial in a counter-clockwise manner may take place without causing simultaneous movement of the clutch housing or cup 138 and of the hollow shaft 137. Counterclockwise movement of the dial shaft, as seen in FIGURE 1, however, causes the rollers to be wedged into firm engagement with the internal wall surfaces of the clutch housing and with the wedge surfaces 141 so that the dial shaft cannot rotate except simultaneously with the clutch housing and with the hollow shaft 137.

The hollow shaft 137 has a sprocket 150 rigidly connected thereto. A chain 151 connects the sprocket 150 to a sprocket 152 rigidly secured to a connecting shaft 153. The connecting shaft 153 is journalled in suitable bearing blocks 154 rigidly connected to the base 95 of the motor 92. The pillow blocks extend through the aperture 156 in the side plate 60 of the supporting frame. The connecting shaft 153 has a gear 157 intermediate its ends which is in mesh with a worm gear 158 on the drive shaft 97 of the electric motor. It will thus be apparent that the clutch cup or housing 138 may rotate in a clockwise manner, FIGURE 12, when the motor shaft 60 also rotates in a clockwise manner, FIGURE 5. Such clockwise rotation of the clutch housing then permits the dial shaft 120 to rotate therewith in a clockwise manner as seen in FIGURE 12 and in a counter clockwise manner as seen in FIGURE 1 since the wedging engagement of the rollers 142 with the internal wall surface of the clutch housing and of the wedging surfaces 141 of the inner clutch member 140 prevents clockwise movement of the dial shaft 120, FIGURE 12, relative to the clutch housing 138 and therefore to the hollow shaft 137 thereof. The dial therefore will rotate in a counter-clockwise manner, FIGURE 1, only if the drive shaft of the motor rotates in a clockwise mnaner, FIGURE 5, to cause the stamp drive roller 80 to move a strip of stamps through the dispensing aperture slot 36.

Energization of the motor 92 is initiated by the closing of the normally open switch 160 mounted on the interior surface of the intermediate section 26 of the front wall. The switch is closed by an actuating lever 161 pivoted, as at 162, to the intermediate front wall section 26 and extending above the dial and beneath a finger stop bar 165 secured to the front wall and extending over the control dial 114. The actuating lever has a lug extending through a suitable aperture in the front wall to engage the switch 160. The control dial is provided with two concentric rows of finger apertures or holes 166 into each of which a finger may be inserted to move the dial a predetermined distance until the finger comes in contact with the switch lever 164 and then with one of the arcuate recesses 167 of the finger stop bar as the dial is rotated by the finger in the same manner as a telephone dial.

A master switch 170 is rigidly mounted to the front plate 66 of the supporting frame by means of suitable bolts 171 and is actuated by a conventional key operated lock 172 which projects through an aperture 172a of the bottom wall 124 of the well and into a lock aperture 173 of the dial located inwardly of the finger holes 166. The lock is adapted to telescope inwardly out of contact with the dial to free the dial for rotation when the proper key is employed, such inward movement of the lock causing the plunger 175 of the lock to engage the actuating lever 176 of the master switch to close it. The master switch is secured by screws 180a to a bracket 181 which has an angularly extending flange which is secured to the supporting plate 66 by screws 182a.

The master switch 170 has a movable contact 180 which connects the input terminal 181 of a plug 182 to a main line conductor 183. The input terminal 184 of the plug is directly connected to the other main line conductor 185. The switch 160 has a stationary contact 186 which is connected to the main line conductor 183 by a conductor 187 and a movable contact 188 which is moved into engagement with the stationary contact 186, when the finger lever 161 is actuated, to energize the winding or coil 190 of a relay 191, the relay winding 190 then being connected across the main line conductors by the conductors 187, 192, 193 and 194. Energization of the relay winding 191 causes the two movable contacts 195 and 196 thereof to engage the stationary contacts 197 and 198, respectively. Engagement of the movable contact 195 with the stationary contact 197 causes the relay winding to remain energized after the finger is pulled out of the selected finger hole of the control dial and thus out of engagement with the actuating lever 161 which then permits the movable contact 188 to again move out of engagement or contact with the stationary contact 186 of the switch 160. The relay winding 190 then remains connected across the main line conductors through the conductors 194, 193 and 192, the contacts 195 and 197, the conductor 200, the stationary and movable contacts 201 and 202 of the plunger actuated switch 205 which are now in engagement with one another and the conductor 206.

The switch 205 is mounted in a suitable manner adjacent the solenoid and is actuated when the solenoid coil 103 is energized and the plunger 104 is retracted out of engagement with the stop disk 105, the plunger has a lug (not shown) which engages the movable contact 202 of the switch so that it is moved into engagement with the stationary contact whenever the solenoid coil is energized and the plunger is retracted. The relay 191 is mounted on the side plate 60 of the supporting frame by screws or in any other suitable manner.

A pilot light 210 may also be connected across the main line conductors 185 and 183 by means of the conductors 211 and 212 so that it will light up whenever the master switch 170 is closed. The pilot light may be mounted on the front wall of the housing in the usual manner to project through an aperture therein adjacent the control dial.

The finger apertures 166 are disposed over suitable indicia 215 which are visible through each finger aperture of the control dial and each indicates the finger hole into which the finger should be inserted to move the dial a distance in the clockwise manner, until such movement is stopped by the engagement of the finger with the finger stop bar 165, which corresponds to the amount of purchase. As illustrated, the indicia indicate progressively greater amounts of purchase in increments of 50¢, it being the intention to dispense one transverse row of stamps for each 50¢ unit or increment of purchase. For example, if the amount of purchase is $3.50, the finger would be inserted in the finger hole through which the numerals $3.50 are seen. Clockwise movement of the control dial will then cause the pin 113 of the control dial to move out of engagement with the movable contact 115 of the solenoid switch 112 which thus permits the movable contact to move into engagement with the stationary contact 216. Closing of the switch 112 causes the solenoid winding 103 to be connected across the main line conductors 183 and 185 through the conductor 217, the contacts 216 and 115 of the switch 112, and the conductors 218 and 219. Energization of the solenoid winding 103 causes the movable contact 202 of the switch 205 to be moved into engagement with the stationary contact 201 thereof by the movement of the plunger 104, as well as the plunger to be withdrawn from one of the peripheral stop recesses 110 of the stop disk 105. The stop disk and the stamp driving roller are now free to rotate but the motor is still not connected to the main line conductors and no rotation thereof, and therefore of the drive roller, will take place until the continued clockwise rotation of the control dial 114 brings the finger into engagement with the finger lever 161 and thus causes the movable contact 188 of the switch 160 to close to engage the stationary contact 186. As a result, the relay winding 190 is energized and causes its contacts 195 and 196 to move into engagement with the stationary contacts 197 and 198, respectively. Engagement of the movable contact 195 with the stationary contact 197 now connects the relay winding 190 across the main line conductors through the switch 205. The relay winding 190 will then remain connected across the main line conductors through the now closed switch 205, even when the finger is withdrawn from the finger hole upon its engagement with the stop bar, so that the motor 192 will be connected across the main line conductors, until the switch 112 is again opened, through the conductors 220 and 221, the contacts 196 and 198 of the relay 191, and the conductors 220 and 187. As the motor rotates, it drives the stamp dispensing roller which thus feeds or dispenses transverse rows of stamps through the dispensing slots 30 and 36. Such rotation of the motor simultaneously causes the hollow shaft 137 of the clutch to rotate in a clockwise direction, FIGURE 12, and thus permits the dial shaft 120 and therefore the control dial to rotate in a counter-clockwise manner as seen in FIGURE 1, the control dial being biased for such counter-clockwise movement by the helical spring 145. As a result, the dial rotates in a counter-clockwise manner simultaneously with and in synchronism with the rotation of the motor and of the stamp dispensing means so that when the preselected number of stamps has been dispensed or fed out of the dispensing or delivery slot 35, the control dial moves back to its original position and causes the pin 113 to contact the movable contact 115 of the switch 112 and open it.

As soon as the switch 112 opens, the solenoid is disconnected from the main line conductors and the plunger moves into one of the stop recesses 110 of the stop disk 105 which is now aligned therewith. Such movement of the plunger into a stop recess brings the stamp dispensing roller to an abrupt stop and prevents it from rotating due to inertia so that only a precise length of the strip of stamps is fed out of the dispensing slot 35. De-energization of the solenoid winding 103 due to the opening of the switch 112 simultaneously permits the switch 205 to open and as a result the relay winding 190 is disconnected from the main line conductors and the movable contacts 195 and 196 move out of engagement with the stationary contacts 197 and 198 thus disconnecting the motor 92 from the main line conductors and causing it to stop further rotation simultaneously with the de-energization of the solenoid and the movement of the plunger into engagement in a stop recess of the stop disk.

The strip of stamps from a roll 230 is disposed about the spacer 77 and between the disks 79 and extends to the stamp drive roller 80 about the direction changing rollers 231 and 232 which are rotatably mounted on shafts 233 and 234, respectively. The shafts are journalled in aligned arcuate recesses in the side plates 59 and 60 and the abutting lower sections 62 and 63 of the supporting frame. The strip of stamps is moved by the stamp drive roller 80 through a chute 236 to the dispensing apertures 30 and 35 of the front wall and reinforcing block 33, respectively.

The chute 236 is substantially U-shaped having lateral side flanges 237 and a bottom or web 238. The chute is pivotally mounted on and between the side plates 59 and 60 of the support frame by means of a shaft 240 which extends through suitably aligned apertures in the side plates and is held in position by any suitable means, such as by cotter keys 241. The rear end of the chute is biased upwardly by a pair of springs 243 whose lower ends are secured to the rear end of the chute in any suitable manner, as by passing the lower ends through apertures in the side flanges 237, and whose upper ends are secured to a bar 244 which extends through aligned apertures in the side plates of the supporting frame and is held in position by means of cotter keys 245. The chute has a channel member 246 whose lateral upwardly extending flanges are secured to the adjacent side flanges of the chute by any suitable means, such as bolts 249, and whose web 248 is spaced above the web 238 of the chute so that the strip is prevented from upward displacement while passing through the chute.

The chute is also provided with a pressure roller 250 which is yieldingly biased toward and held in contact with the strip of stamps as it passes around the drive stamp roller by the force of the springs 243 so that the strip is held in engagement with the drive stamp roller by the pressure roller 250. The pressure roller is rotatably mounted on a shaft 251 which is journalled in the side flanges 237 of the chute. The roller is provided with laterally spaced annular recesses 253 aligned with the drive lugs 87 of the stamp drive roller so that the lugs may be received in the annular recesses of the pressure roller in such manner that the drive lugs do not interfere with the action of the pressure roller on the strip of stamps.

A flexible brake member 255 has an end loop 256 through which the pin 257 on the supporting frame extends to secure one end of the flexible brake member while the other end of the flexible brake member is provided with an end loop 258 in which is received a cylindrical weight 259. The brake member is looped about the roll of stamps 230 and is held in frictional engagement therewith by the weight 259 to prevent overrunning of the roll of stamps during dispensing operations.

It will now be seen that the stamp dispensing unit 50 may be used to dispense any preselected number of transverse rows of stamps of the five transversely aligned longitudinal rows 52 of stamps 53 from the roll 230 into which the strip is wound and that the number of transverse rows of stamps which is dispensed during any operation may be preselected by placing a finger into the finger hole through which an indicia is visible which corresponds to the desired number of stamps. For example, it may be desired to dispense 5 stamps or 1 transverse row of stamps for each 50¢ of the amount of purchase. In this event, the indicia increase by increments of 50 in a counter-clockwise direction from the finger stop bar as illustrated in the drawing. If the purchase was in the amount of $3.50, the finger is inserted in the finger hole of the control dial through which the indicia indicating $3.50 is visible and the control dial is rotated in a clockwise manner toward the finger bar 165. Immediately upon initiation of such clockwise movement of the control dial, the solenoid switch 112 closes to energize the solenoid winding 103 whereupon the plunger 104 is retracted from the stop recess 110 of the stop disk 105 to free the stop disk and the stamp drive roller for rotation. Simultaneously, the retraction of the plunger 104 closes the relay 205 which prepares the control circuit to keep the winding 190 of the relay 191 energized after continued movement of the finger and the control dial brings the finger into contact with the actuating lever 161 of the switch 160 and momentarily closes this switch. Such closing of the switch 160 causes the motor 190 to be connected across the main line conductors and simultaneously keeps the relay winding 190 energized even after the switch 160 opens again upon withdrawal of the finger from the finger hole of the control dial.

The energization of the motor 92 causes the drive roller to be rotated in a clockwise manner, as seen in FIGURE 5, whereupon the strip of stamps is moved forwardly through the chute 236 and outwardly through the dispensing slots 30 and 35 of the housing and the reinforcing block, the counter-clockwise rotation of the control dial being simultaneous and in synchronism with the rotation of the drive roller since the clutch between the shaft of the control dial and the hollow shaft 137, driven by the motor 92 prevents counter-clockwise rotation of the control dial relative to the shaft 137 even though the control dial is biased for rotation in this direction by the helical spring 145. As a result, the control dial will move back to its initial position only after the predetermined number of transverse rows of stamps have been dispensed through the dispensing slot 35 whereupon the solenoid switch 112 is closed to de-energize the solenoid winding 103. The springs 106 then move the plunger outwardly into a stop recess 110 of the stop disk 105 whereupon further movement of the stamp disk and also stamp drive roller and also of the motor is immediately arrested. A transverse row of perforations is then aligned with the edges of the reinforcing block defining the dispensing slot 35 so that the dispensed rows of stamps may be easily severed from the strip still retained in the stamp dispensing device.

A suitable counter 265 may be mounted on the bottom wall 24 and have its operator lever 266 extending adjacent the stop disk which is provided with laterally projecting counter pins 267, one adjacent each slot 110 of the stop disk so that the counter will count and record the dispensing of each transverse row of stamps so that the operator may tell at a glance when the door 40 is open, how many stamps have been dispensed from the strip.

It will now be apparent that a stamp dispensing device has been illustrated and described which has an electric motor or prime mover for dispensing a strip of stamps from a roll rotatably supported in the dispensing device and that a control circuit for controlling the rotation of the motor has been provided in order to permit the motor to dispense only preselected number of stamps from the strip.

It will further be seen that a preselection of the number of stamps to be dispensed is affected by the insertion of the finger in a preselected finger aperture of a control dial and the rotation of the dial in a clockwise manner through a thus preselected distance.

It will further be apparent that the control dial may be moved in a clockwise direction independent of the rotation of the motor but may be moved in the opposite counter-clockwise direction only in synchronism with the rotation of the motor whereby such counter-clockwise rotation of the control dial occurs only during the dispensing operation.

It will further be seen that a stop or brake has been provided for the drive roller, which engages the strip of stamps to move the stamps outwardly through a dispensing slot of the device, which acts to immediately arrest movement of the stamp dispensing device and therefore of the movement of the strip of stamps through the dispensing slot upon de-energization of the motor and to align a transverse row 90 of perforations with the edges of the stop block defining the dispensing slot 35 so that only the precise number of stamps are ever dispensed through the dispensing slot and so that the strip of stamps is always stopped with a row of transverse perforations 90 in alignment with the outer edges of the reinforcing block defining the dispensing slot whereby the stamps may always be easily separated along the transverse row of perforations and tearing of the stamps is precluded.

It will further be seen that the control circuit for controlling the actuation of the motor and of the brake device or solenoid 101 includes a solenoid switch which closes immediately upon the initiation of clockwise movement of the control dial in order to unlock the stamp drive roller for rotation and that the energization of the motor is initiated by the closing of a switch 160 when the control dial has been rotated through a preselected angle and the finger which has been inserted in the preselected finger hole engages the stop bar 165 and is then immediately withdrawn from such finger hold to permit counter-clockwise movement of the dial back to its initial position.

It will further be seen that the momentary closing of the switch 160 energizes a relay 191 which is maintained in energized condition until the solenoid switch is again opened.

The stamp dispensing unit 250b is mounted in the housing to one side of the stamp dispensing unit 50 and is employed to dispense stamps from a single row of longitudinally aligned stamps in the event that a purchase is made whose total amount is not a multiple of 50¢. For example, if the amount of the purchase is $3.70, it is necessary to dispense 37 stamps. The stamp dispensing unit 50 will then be employed to dispense 35 stamps and the stamp dispensing unit 250 will be employed to dispense two additional stamps to make the total of 37.

The dispensing unit 250b includes a drum 251b on which a roll having a single longitudinal row of stamps may be disposed. The drum is provided with side disks 252b and is rotatably held on a shaft 253b, secured to the side wall 22 in any suitable manner, by a cap or nut 254b threaded thereon. Spacers 255a hold the drum properly aligned relative to the other elements of the device. The strip of tape extends about guide rollers 255b, 256b and 257b which are mounted on an L-shaped bracket 258b by means of shafts 260b secured to the bracket by means of the nuts 262b on their threaded ends. The bracket in turn is secured to a solenoid mounting bracket 263b by bolts 264b. The solenoid bracket is rigidly secured to the longitudinal side members 265 whose inturned horizontal flanges 266 together with the web 277 of an inverted channel form a chute for the passage of the strip of stamps. The side flanges 278 of the inverted channel rest on the bottom wall 24 of the housing. The side longitudinal members 265 and the channel are secured to each other and to supporting angle brackets 268 by bolts 269. The angle brackets are in turn secured to the bottom wall 25 by bolts 280. The solenoid 281 is supported by the solenoid bracket 263b and by the standards 284 and the spacers 285 which are secured to the inner longitudinal member 265 by the screw 269.

The solenoid has a plunger 290 whose extension 291 extends through an aperture in a flange 291a of a substantially U-shaped guide bracket 292 whose other flange 293 is provided with an adjusting screw 294 which limits the outward movement of the plunger. The U-shaped bracket 292 is secured to the outer longitudinal side member 265 by an arm 296 by means of screws 297.

Figure 6:
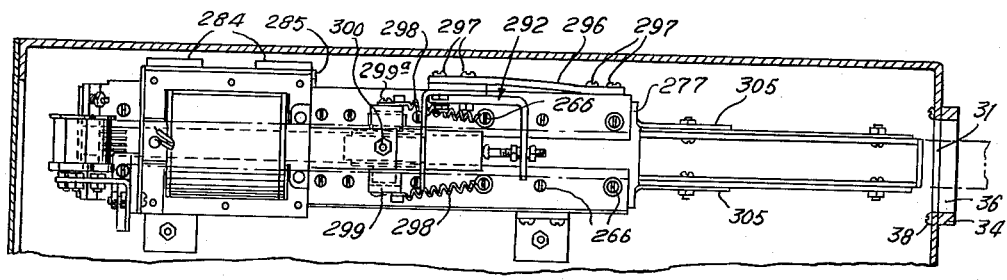
FIGURE 6 is a horizontal sectional view taken on line 6—6 of FIGURE 4.
Figure 7:
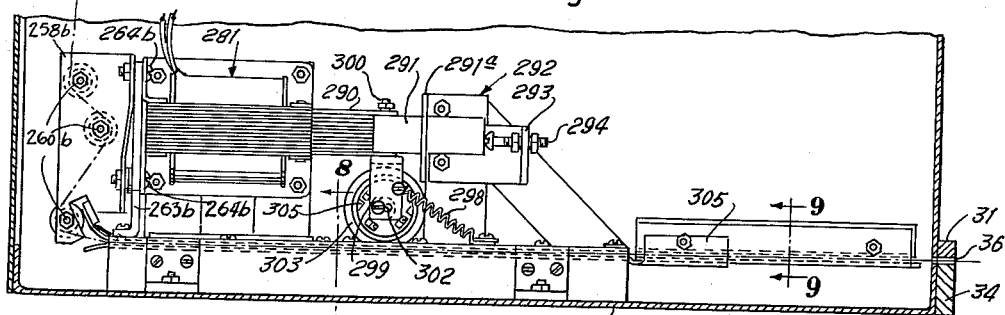
FIGURE 7 is a vertical sectional view taken on line 7—7 of FIGURE 4.
Figures 8, 9:
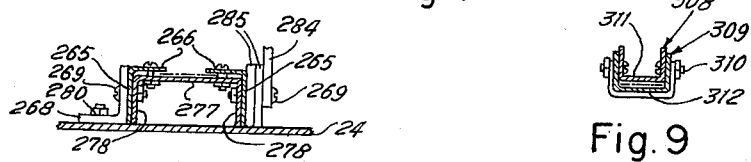
FIGURE 8 is a sectional view taken on line 8—8 of FIGURE 7.
FIGURE 9 is a sectional view taken on line 9—9 of FIGURE 7.
Figure 10:
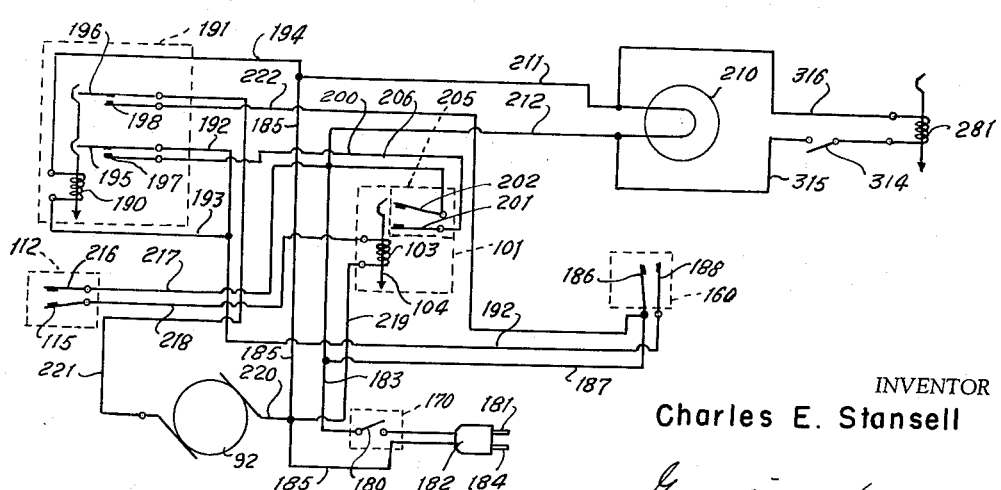
FIGURE 10 is a diagrammatic illustration of the electric control circuit of the stamp dispensing device.

The plunger is biased to the outer position illustrated in FIGURES 6 and 7 by a pair of springs 298 whose forward ends are secured to the side members by a pair of the screws 266 and whose rearward ends are secured to a downwardly opening bifurcated bracket 299 of the plunger 290 by screws 299a. The bracket is secured to the plunger by a screw 300 which also secures the extension 291 to the plunger. The bifurcated bracket 299 supports a shaft 302 on which is mounted a drive wheel 303 for rotation in a counterclockwise direction, as seen in FIGURE 7, only by means of a suitable clutch mechanism 305, which may be substantially the same type as the clutch arrangement illustrated in FIGURE 12 for connecting the dial shaft to the hollow shaft. As a result, when the plunger is retracted, the wheel may turn in a clockwise direction about its axis 302 as it is moved rearwardly over the strip of stamps. When the solenoid is de-energized, however, the plunger is pulled forwardly by the springs 298 and since the wheel may not rotate in a counter-clockwise direction, the wheel frictionally engages the upper surface of the strip of tape and moves it forward a predetermined distance which is equal to the length of one of the stamps. The wheel may be provided with a friction surface while the upper surface of the web 277 is smooth to facilitate its forward sliding movement in the chute.

The forward portions of the flanges 278 are upturned as at 305 and a chute formed of a pair of telescoped inverted channels 308 and 309 is received between the upturned flanges and secured thereto by bolts 310. The strip of stamps slides in the space between the webs 311 and 312 of the inverted channels and outwardly through the dispensing or delivery apertures 31 and 36.

The solenoid 281 is connected across the main line conductors 183 and 185 by the push button switch 314 through the conductors 212, 315, 316 and 211 each time the push button switch is closed.

It will now be seen that if it is desired to dispense a single stamp, the push button switch 314 which is mounted adjacent the control dial on the intermediate section 26 of the front wall 25 of the housing is depressed to connect the solenoid 281 across the main line conductors 183 and 185 whereupon the plunger is drawn into the solenoid coil, the drive wheel 303 rotating as it passes over the strip of tape. When the pressure on the push button is released, the switch 314 opens and de-energizes the solenoid whereupon the force of the springs 298 moves the plunger forwardly and, since the drive wheel cannot rotate in a clockwise direction, it frictionally engages the top surface of the strip and causes one stamp to be dispensed or delivered through the dispensing slot 36. The push button switch 314 is closed as many times as the number of stamps which it is desired to dispense. For example, when it is desired to dispense 37 stamps and 35 have already been dispensed by the dispensing unit 50, the push button switch is closed twice.

It will thus be seen that the combination of the two dispensing units 50 and 250 permits the dispensing of any number, either even or odd, of stamps as is desired by simple operation of the control dial of the dispensing unit 50 and the push button switch 314 of the single stamp dispensing unit 250 without making necessary the handling of the stamps prior to their delivery.

Figure 15:
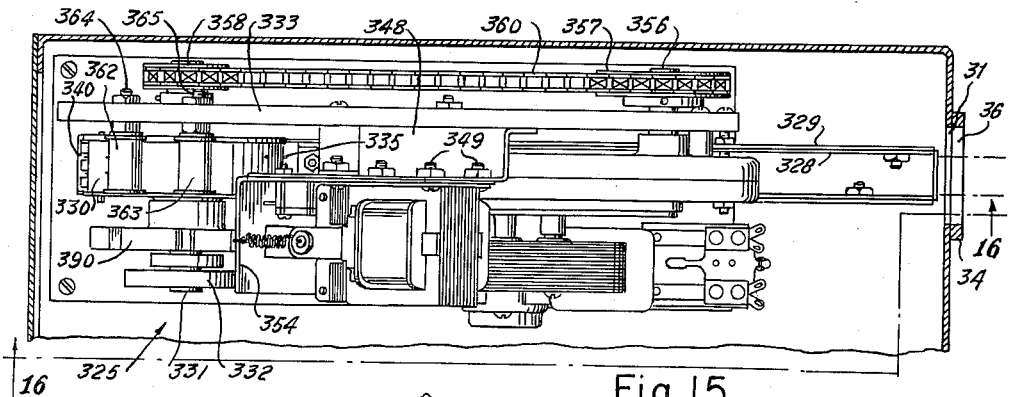
FIGURE 15 is a fragmentary top plan view of a modified form of a stamp dispensing device for dispensing the strip formed of a single longitudinal row of stamps.
Figure 16:
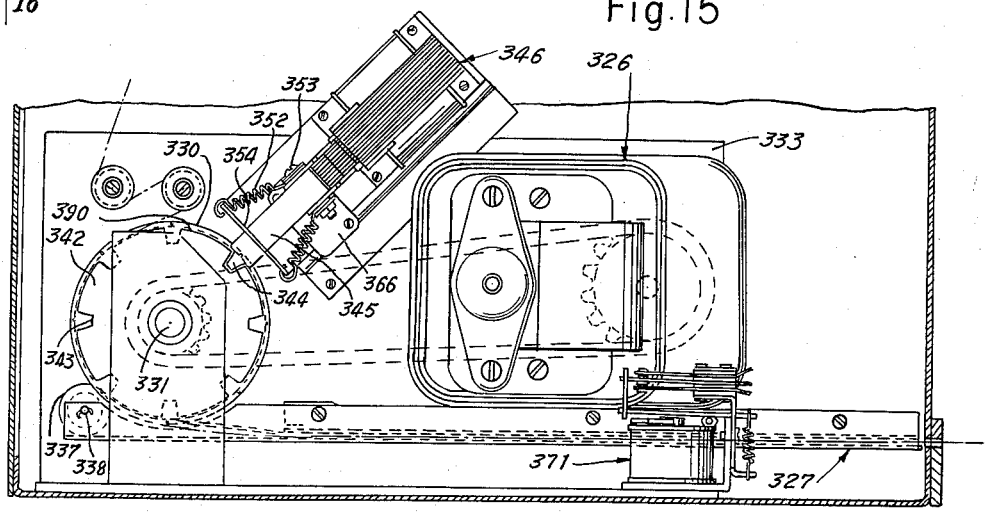
FIGURE 16 is a sectional view taken on line 16—16 of FIGURE 15.
Figure 17:
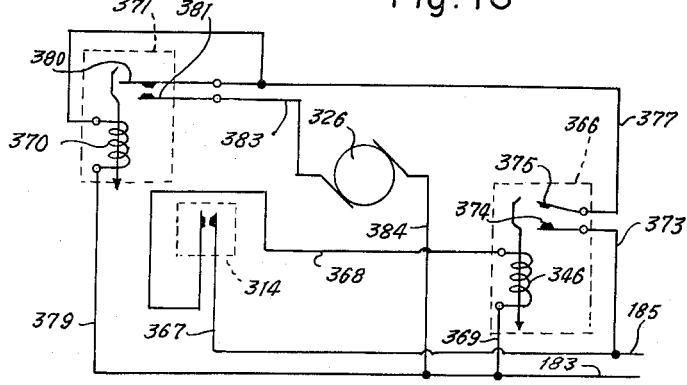
FIGURE 17 is a diagrammatic illustration of the electric control circuit of the dispensing device illustrated in FIGURES 15 and 16.

FIGURES 15, 16 and 17 of the drawing illustrate a modified form of the single stamp dispensing unit. The single stamp dispensing unit 325 includes a motor 326 which is mounted over a chute 327, similar to the chute shown in FIGURES 6 and 7, formed of a pair of inverted channels 328 and 329 whose webs are spaced from one another to form a longitudinal chute or slot through which a single strip of stamps may be moved by a stamp drive roller 330 whose shaft 331 is rotatably mounted on side plates 332 and 333. The drive roller 330 is provided with drive lugs 335 adapted to extend through apertures or perforations between each pair of adjacent longitudinally aligned stamps.

A pressure roller 337 rotatably mounted on a shaft 338, which extends through aligned apertures in the side flanges of the outer inverted channel 329, yieldingly engages the strip of stamps extending about the drive roller to hold the stamps in engagement with the drive roller. The pressure roller 337 is provided with spaced annular recesses 340 in which the ends of the drive lugs are received as they pass the pressure roller.

A stop disk 342 is rigidly secured to the shaft 331 and is provided with peripheral stop slots 343 in which the outer reduced end 344 of the plunger 345 of the solenoid 346 is received to prevent movement of the stamp drive roller in either direction. The solenoid 346 is mounted by means of a bracket 348 to the side plate 333 by any usual means, such as the bolts 349. The plunger 345 of the solenoid 346 is biased outwardly by a pair of springs 352 whose forward ends are secured to the plunger by means of the screw 353 and whose lower ends are secured to the laterally extending bracket flange 354 which is provided with a guide aperture through which the plunger 345 extends outwardly toward the stop disk 342.

The drive shaft 356 of the motor 326 is provided with a sprocket 357 and the drive roller shaft 331 with a sprocket 358 which are connected by the chain 360 whereby when the motor is energized the rotation of its drive shaft 356 causes the stamp drive roller to rotate in a counter-clockwise direction, as seen in FIGURE 16, to pull the strip of stamps from a supply roll (not shown) around the guide rollers 362 and 363 rotatably mounted on shafts 364 and 365, respectively, secured to the side plates 333 in any suitable manner, as by nuts illustrated in FIGURE 15, and through the chute 327 and out the dispensing or delivery slots 31 and 36 of the front wall and the reinforcing block 34, respectively.

The plunger 345 when it is moved towards its retracted position upon the energization of the solenoid 346 closes a switch 366 mounted on the bracket 348 adjacent the plunger and holds the switch 366 closed as long as it is in its retracted position. The solenoid is energized by the closing of the switch 314 on the intermediate section 26 of the front wall of the housing which is connected in series with the solenoid across the main line conductors 183 and 185 by the conductors 367, 368 and 369 when the switch 314 is closed. When the switch 314 is closed, the solenoid 346 is energized and closes the switch 366 to connect the coil 370 of the relay 371 across the main line conductors 183 and 185 through the conductor 373, the stationary and movable contacts 374 and 375, respectively, of the switch 366 and the conductors 377, 378 and 379. When the coil 370 of the relay 371 is energized, its movable contact 380 engages its stationary contact 381 to connect the motor 326 across the main line conductors through the conductor 373, the contacts 374 and 375 of the switch 366, the conductor 377, the contacts 380 and 381 of the relay 371, and the conductors 383 and 384. As a result, the motor will be energized and will cause its drive shaft 356 to rotate even when pressure is relieved from the push button switch 314 so that its contacts open since the switch 366 will remain closed even though the solenoid 346 is de-energized due to the fact that the lower end of the plunger 345 will contact the peripheral surface 390. Contact of the peripheral surface 390 of the stop disk keeps the plunger in its retracted position until the stop disk is rotated to position a stop recess or slot 343 in alignment with the reduced end 344 of the plunger whereupon the force of the springs 352 moves the plunger into the recess whereupon further rotation of the stamp drive roller and of the motor is stopped. Simultaneously the switch 366 opens to disconnect the relay winding 370 from the main line conductors and cause the relay 371 to open whereupon the motor is disconnected from the main line conductors. The stop slots are so spaced along the periphery of the stop disk that the stamp drive shaft will rotate only a sufficient distance to dispense one stamp through the dispensing slots 31 and 36 every time the push button 314 is actuated. The push button must be actuated once for each stamp which is to be dispensed.

It will be apparent that if desired, the relay 371 may be dispensed with if the switch 366 is of sufficient capacity to handle the current drawn by the motor 326 in which case the conductor 383 is connected directly to the conductor 377.

It will now be apparent that the single stamp dispensing unit 325 is provided with the same type of drive roller, stop disk and solenoid operated plunger as the stamp dispensing unit 50 but it is operable to dispense only one stamp at a time, the plunger and the stop disk properly positioning each dispense stamp relative to a tearing edge provided by the reinforcing block 34 so that the dispensed stamp may be severed from the strip along the transverse line of perforations without tearing any stamp and that a stamp will be dispensed each time the push button switch is closed.

In the FIGURES 18 through 22 are illustrated modified forms of the drum assembly for holding the roll of stamps, the braking means for preventing over-running of the roll of stamps and the mounting means for the guide and pressure rollers. The modified drum assembly 400 includes a pair of side disks 401 and 402 rigidly mounted on cylindrical core sections or member 403 and 404. A shaft 405 is rigidly secured to and extends through the core member 403 so that an outer end portion extends laterally outwardly of the core member to be received in one of the slots 72 of the side plates 59 or 60 of the support frame. The other core member is provided with an axial aperture through which the shaft 405 may extend so that its other end portion may project laterally outwardly of the core member 404 in the opposite direction and be received in the other of the slots 72 of the side panels 59 or 60 of the support frame of the dispensing unit 50. Inward movement of the disks 402 and 401 toward each other is arrested by the engagement of the inner ends of the core members. The core members are also provided with inwardly extending annular beveled surfaces 410 whereby the core members may be easily slid into the central aperture of a roll of stamps without tearing any of the stamps even if the roll of stamps is not provided with the usual cylindrical tubular core. It will thus be apparent that the drum assembly may be easily removed from the support frame and disassembled by moving the shaft 405 out of axial aperture 408 of the core member 404 and that thereupon a roll of stamps may be slid over one of the core members 403 or 404, the beveled surface 410 thereof aiding in such placement of the roll and then the other disk may be assembled to the first disk by passing the shaft 450 through the axial passage 408 whereupon the movement of one disk towards the other causes the other core member to move into the opposite side of the central aperture of the roll of stamps until such movement is stopped by the engagement of the internal ends of the core members 403 and 404. The ends of the shaft 450 then project laterally outwardly of the core members 403 and 404 and the assembly may then be mounted on the frame members 59 and 60 by moving such laterally projecting portions of the shaft into the slots 72.

The brake for preventing over-running of the roll of stamps includes a substantially L-shaped bracket 410 whose lower flange 412 is secured to the side frame members 59 and 60 by screws 413. The upper horizontal leg of the L-shaped bracket 410 is provided with downwardly extending lugs 415 to which is pivotally secured a brake bar 416 by means of a pivot pin 417 which extends through aligned apertures in the flanges 415 of the bracket and the side flanges 418 of the brake bar. The brake bar is yieldably biased outwardly and downwardly from the top leg of the bracket 410 by a spring 420 whose coils extend about the pin 417, the spring is provided with an angularly offset end portion 441 which projects upwardly through a suitable aperture of the bracket 410 to be held thereby against displacement. The other end portion 422 of the spring bears against the brake bar 416. The free end of the brake bar 416 may be provided with a curved portion 424 to facilitate sliding movement of the roll of stamps past the brake bar.

The brake bar 416 is thus yieldably urged or pressed against the outer surface of the roll of stamps, the force with which it engages the roll of stamps decreasing as the roll decreases in size as the stamps are dispensed so that the greatest braking action exists when it is needed most, that is, when the roll of stamps is of the largest diameter, to prevent over-running of the roll of stamps when the stamp drive roller 80 stops rotation.

The guide rollers 231 and 232 have their shafts 233 and 234 journaled in movable brackets 427 pivotally secured at their lower ends to the side plates 59 and 60 by means of the stub shafts 428. The brackets 427, of course, are disposed on opposite sides of the drive roller 80 and are movable between operative positions, illustrated in FIGURE 18, and their loading positions, illustrated in FIGURE 19, about the stub shafts 428. The pair of brackets 427 moves as a unit with the guide rollers since the shafts 233 and 234 are rotatably secured to the brackets 427 at their opposite ends. Pivotal movement of the brackets 427, and therefore of the guide rollers 231 and 232, is limited by stop bars 429 whose upper ends project into the downward path of movement of the brackets 427 and which may be secured to the bottom wall of the housing or to the side frame members 59 and 60 in any suitable manner. The brackets 427 are latched in operative position, illustrated in FIGURE 18, by the engagement of their laterally projecting protrusions 430 in the recesses 431 of the side plates 59 and 60. The brackets 427 are slightly resilient to allow inward flexing of the brackets as the lateral protrusions 430 engage the internal sides of the side plates 59 and 60 prior to being received in the recesses 431.

It will be apparent that when it is desired to load or thread a strip 51 of stamps about the guide roller, the bracket and guide roller assembly may be pivoted outwardly to the position illustrated in FIGURE 19 whereupon the guide rollers 231 and 232 are easily accessible and the strip of stamps may be easily threaded thereabout in the manner illustrated.

The pressure roller 250 has the outwardly projecting end portions of its shaft 251 extending through the lateral longitudinal slots 432 in the side flanges 237 of the chute 236 which is now rigidly secured to the side frame members 59 and 60 by any suitable means, such as an additional shaft or pin 434 similar to the pin or shaft 240 which is secured in a similar manner to the side frame members 59 and 60. The slots 432 are provided with upwardly extending forward portions 435 adjacent the drive roller whereby when the pressure roller 250 is moved forwardly it is moved upwardly toward the drive roller due to the engagement of the projecting lateral end portions of its shaft 251 in such upwardly extending end portions 435 of the lateral slots 432. Leaf springs 437 are secured to the side flanges 237 by means of a suitable screw or rivet 438 and their free ends exert an upward force on the pressure roller shaft 251 to cause it to move upwardly into the upwardly extending end portions of the slots.

The extreme outer portions of the springs 437 are bent into hooks, as at 440, in order that the pressure roller shaft 251 be received therein and held against forward movement in the slots 432 when the pressure roller is in the extreme rearward loading position illustrated in FIGURE 20. A substantially U-shaped push bracket 442 has angularly extending end portions 443 disposed outwardly of the side flanges 237 of the chute 236 which are secured to the end portions of the shaft 251 projecting laterally outwardly of the side flanges of the chute whereby the push bracket 442 may be employed to move the pressure roller between its operative position illustrated in FIGURES 18 and 19 and its loading position illustrated in FIGURE 20. It will be apparent that when the push roller is moved to its rearward loading position, the strip of stamps may be easily threaded about the drive roller 80 so that the lugs 87 thereof enter into the drive perforations 88 of the strip of stamps and that after the strip of stamps has been so threaded or placed in engagement with the drive roller, the pressure roller may be moved forwardly and then upwardly toward the stamp roller to yieldingly hold a strip of stamps in engagement with the drive roller. The springs 437 maintain the pressure roller in such operative position in engagement with the strip of stamps.

It will be apparent that when the rear cover 40 of the housing is open, a roll of stamps may be easily loaded on the drum assembly 400 since the guide rollers and the pressure roller are now readily accessible from the now open rear end of the housing. The strip of stamps may be easily threaded about the guide rollers and into engagement with the drive roller 80 and then guided through the chute to the dispensing aperture since the guide rollers and the pressure roller may be moved outwardly to cause the guide roller and the drive roller to be readily accessible for such loading operations.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A dispensing device for dispensing tape having longitudinally spaced perforations including: a drive roller having drive means on its periphery adapted to engage in the perforations in the tape to dispense the tape from the device when the drive roll is rotated; means for rotating the drive roller; brake means operatively associated with the drive roller for stopping rotation of the drive roller in either direction when the drive means is inoperable; and means for controlling the operation of the drive means to cause preselected lengths of the tape to be dispensed upon each actuation of the drive means, said control means comprising a rotatable dial having a plurality of circumferentially spaced finger holes, said control dial being rotatable independently of the rotation of the drive means from its rest position in one direction toward an operative position to preselect the length of tape to be dispensed and being rotatable in the opposite direction from its operative position toward its rest position in accordance with the rotation of the drive roller; said means for preventing rotation of the drive roller including a stop disk rigid with the drive roller and having a plurality of circumferentially spaced peripheral slots and a plunger movable into the slots for preventing rotation of the drive roller.

2. A stamp dispensing device for dispensing stamps from an elongate strip of stamps including: a drive roller for moving said strip to a delivery position; means for rotating said drive roller; means for preventing rotation of the drive roller in either direction upon cessation of operation of the means for rotating the drive roller; a plurality of guide rollers for guiding the strip of stamps to the drive roller, said guide rollers being mounted for movement away from the drive roller to facilitate the positioning of the strip thereabout and about the drive roller; and a pressure roller yieldingly biased toward the drive roller for yieldingly holding a strip of stamps in engagement with said drive roller, said pressure roller being mounted on a shaft; supporting structure adjacent the pressure roller having elongate slots, outer end portions of the shaft extending outwardly through the elongate slots, said elongate slots being provided adjacent the drive roller with extensions extending angularly from said elongate slots and toward the drive roller; and means on said supporting structure biasing said outer end portions of the shaft in said extensions toward said drive roller.

3. A dispensing device for dispensing tape having longitudinally spaced perforations including: a drive roller having means on its periphery adapted to engage in the perforations in the tape to dispense the tape from the device; drive means for rotating the drive roller; brake means operatively associated with the drive roller for stopping rotation of the drive roller in either direction when the drive means is rendered inoperable; means for controlling the operation of the drive means to cause preselected lengths of the tape to be dispensed upon each actuation of the drive means, said control means comprising a rotatable dial having a plurality of circumferentially spaced finger holes and being rotatable in one direction from a rest position independently of the rotation of the drive means toward an operative position to preselect the length of tape to be dispensed and being rotatable in the opposite direction toward its rest position from its operative position in accordance with the rotation of the drive roller; first means operatively connected with the brake means and actuated by the control dial when the control dial is in its rest position for rendering the brake means effective to hold the drive roller against rotation, said first means being actuated upon movement of the control dial from its rest position to cause the brake means to release the drive roller for rotation; and second means adjacent the control dial and operable by a finger inserted in a selected finger hole when the control dial has been rotated a distance predetermined by said selected finger hole for actuating the drive means, the control dial rotating in the opposite direction toward its rest position in accordance with the rotation of the drive roller upon actuation of the drive means.

4. A dispensing device for dispensing tape having longitudinally spaced perforations including: a drive roller having means on its periphery adapted to engage in the perforations in the tape to dispense the tape from the device; drive means for rotating the drive roller; brake means operatively associated with the drive roller for stopping rotation of the drive roller in either direction when the drive means is rendered inoperable; means for controlling the operation of the drive means to cause preselected lengths of the tape to be dispensed upon each actuation of the drive means, said control means comprising a rotatable dial having a plurality of circumferentially spaced finger holes and being rotatable in one direction from a rest position independently of the rotation of the drive means toward an operative position to preselect the length of tape to be dispensed and being rotatable in the opposite direction toward its rest position from its operative position in accordance with the rotation of the drive roller; first means operatively connected with the brake means and actuated by the control dial when the control dial is in its rest position for rendering the brake means effective to hold the drive roller against rotation, said first means being actuated upon movement of the control dial from its rest position to cause the brake means to release the drive roller for rotation; and second means adjacent the control dial and operable by a finger inserted in a selected finger hole when the control dial has been rotated a distance predetermined by said selected finger hole for actuating the drive means, the control dial rotating in the opposite direction toward its rest position in accordance with the rotation of the drive roller upon actuation of the drive means; said means for preventing rotation of the drive roller including a stop disk rigid with the drive roller and having a plurality of circumferentially spaced peripheral slots and a plunger movable into the slots for preventing rotation of the drive roller; and electrically operable means for withdrawing said plunger from engagement with the stop disk, said first means comprising switch means for connecting said electrically operable means to a source of current.

5. A dispensing device for dispensing tape having longitudinally spaced perforations including: a drive roller having means on its periphery adapted to engage in the perforations in the tape to dispense the tape from the device; drive means for rotating the drive roller; brake means operatively associated with the drive roller for stopping rotation of the drive roller in either direction when the drive means is rendered inoperable; means for controlling the operation of the drive means to cause preselected lengths of the tape to be dispensed upon each actuation of the drive means, said control means comprising a rotatable dial having a plurality of circumferentially spaced finger holes and being rotatable in one direction from a rest position independently of the rotation of the drive means toward an operative position to preselect the length of tape to be dispensed and being rotatable in the opposite direction toward its rest position from its operative position in accordance with the rotation of the drive roller; first means operatively connected with the brake means and actuated by the control dial when the control dial is in its rest position for rendering the brake means effective to hold the drive roller against rotation, said first means being actuated upon movement of the control dial from its rest position to cause the brake means to release the drive roller for rotation; and second means adjacent the control dial and operable by a finger inserted in a selected finger hole when the control dial has been rotated a distance predetermined by said selected finger hole for actuating the drive means, the control dial rotating in the opposite direction toward its rest position in accordance with the rotation of the drive roller upon actuation of the drive means; said means for preventing rotation of the drive roller including a stop disk rigid with the drive roller and having a plurality of circumferentially spaced peripheral slots and a plunger movable into the slots for preventing rotation of the drive roller; and electrically operable means for withdrawing said plunger from engagement with the stop disk, said first means comprising switch means for connecting said electrically operable means to a source of current; said drive means being electrically energizable, said second means comprising means for connecting said drive means to a source of current; and third means held in operative position by said plunger when said plunger has been moved to its withdrawn position for maintaining said rotating means connected across a source of current after said second means has been actuated.

References Cited in the file of this patent
UNITED STATES PATENTS

| | | |
|---|---|---|
| 2,102,446 | Wallace | Dec. 14, 1937 |
| 2,229,100 | Lapsley | Jan. 21, 1941 |
| 2,264,647 | Stearns | Dec. 2, 1941 |
| 2,670,906 | Daniels et al. | Mar. 2, 1954 |
| 2,746,751 | Le Baron et al. | May 22, 1956 |
| 2,748,861 | Von Stoeser | June 5, 1956 |
| 2,801,848 | Taylor | Aug. 6, 1957 |
| 2,845,266 | Hempel | July 29, 1958 |

FOREIGN PATENTS

| | | |
|---|---|---|
| 773,504 | France | Sept. 3, 1934 |